United States Patent [19]

Wissmann

[11] Patent Number: 5,500,473
[45] Date of Patent: Mar. 19, 1996

[54] MINERAL FILLED COPOLYAMIDE COMPOSITIONS

[75] Inventor: Rolf B. Wissmann, Vesenaz, Switzerland

[73] Assignee: E. I. du Pont de Nemours and Company, Wilmington, Del.

[21] Appl. No.: 230,052

[22] Filed: Apr. 19, 1994

Related U.S. Application Data

[63] Continuation-in-part of Ser. No. 54,208, Apr. 30, 1993, abandoned.

[51] Int. Cl.$^6$ .................................................. C08K 3/34
[52] U.S. Cl. .......................... 524/447; 524/449; 524/451; 524/494; 524/538
[58] Field of Search ................................. 524/447, 449, 524/451, 494, 538

[56] References Cited

U.S. PATENT DOCUMENTS

| | | | |
|---|---|---|---|
| 4,607,073 | 8/1986 | Sakashita et al. | 524/404 |
| 4,937,322 | 6/1990 | Barthelemy | 528/349 |
| 5,378,800 | 1/1995 | Mok et al. | 528/349 |

*Primary Examiner*—Edward Cain

[57] ABSTRACT

According to the present invention there is provided a polymeric composition comprising:

(a) a first polyamide prepared from an aromatic carboxylic acid component and an aliphatic diamine component, the aliphatic diamine component being a mixture of hexamethylene diamine and 2-methyl 1,5-pentamethylene diamine;

(b) a second polyamide selected from an aliphatic polyamide, a semiaromatic polyamide, or mixtures or blends thereof; and (c) a mineral filler.

These polymeric compositions have a $T_g$ of about 117° C. or less. These compositions provide a $T_{cc}$ of about 145° C. to 160° C. Molded articles made from these compositions have a good surface appearance.

18 Claims, No Drawings

MINERAL FILLED COPOLYAMIDE COMPOSITIONS

CROSS-REFERENCE TO RELATED APPLICATION

This application is a continuation-in-part of prior application Ser. No. 08/054,208 filed Apr. 30, 1993 abandoned and entitled Mineral Filled Copolyamide Compositions.

FIELD OF THE INVENTION

This invention relates, generally, to polyamide blends. More specifically, this invention relates to mineral filled blends of semiaromatic polyamides and aliphatic polyamides.

BACKGROUND DISCUSSION

Aliphatic polyamide resins, such as polyamide 6.6, are very strong resins well suited for molding of various articles; however, when such resins are filled with mineral fillers, injection molded articles made from such resins are disadvantageously sensitive to moisture, do not exhibit a very glossy surface and have a low heat distortion temperature.

PCT Patent Application WO 91/15537 discloses a semi-aromatic, semicrystalline copolyamide made from terephthalic acid, hexamethylene diamine and 2-methyl pentamethylene diamine and containing glass fillers. Those copolyamides have low moisture pickup and a heat distortion temperature ("HDT") under load of 1MPa of at least 240° C. In order to achieve this high HDT, the addition of highly reinforcing fillers such as glass fibers and a high degree of nucleation are necessary. However, such filled compositions do not provide a smooth, glossy surface in molded articles, particularly injection molded articles. For certain applications such as automotive head lamp reflector housings, surface gloss is an important requirement. For those kind of applications glass-filled compositions are often unsuitable for surface appearance. In addition, the use of glass fillers in such applications results in an unnecessary expense because HDT does not need to be 240° C. or higher.

In addition, semicrystalline copolyamide compositions tend to crystallize very slowly. An indication of the rate of crystallization is the exothermic cold crystallization peak temperature ("$T_{cc}$") as measured by Differential Scanning Calorimetry ("DSC"). For example, to injection mold a resin that has a $T_{cc}$ of 170° C., it is necessary to use a mold temperature of greater than about 170° C. to allow the molded part to crystallize completely. However, such a high mold temperature is not desirable. Such high temperature molding requires high energy expenditures to heat the mold and may require expensive equipment which is often difficult to control. It is known in the art to nucleate such a copolyamide composition in order to lower its $T_{cc}$ to below 150° C., which is considered to be a maximum acceptable commercial mold temperature.

On the other hand, the lowest practical limit for a suitable mold temperature that provides good crystallization of the injection molded part is generally determined by the glass transition temperature ("$T_g$") of the polymer. For a polymer with a $T_g$ of 120° C., for example, the mold temperature should not be below about 120° C. to achieve complete crystallization and stress free injection molded parts. Because $T_g$ also reflects a resin's high temperature performance, it is desirable to provide a copolyamide composition with an acceptable combination of $T_g$ and $T_{cc}$.

Japanese published patent application (Kokai) 61-162550 of K. Hikami et al., published 1986 July 23, discloses polyamides formed from 0.4–0.6 mole of aromatic diamines and/or aromatic carboxylic acids per mole of polyamide-monomer forming composition. If the polyamide is formed from both terephthalic acid and isophthalic acid, then the ratio of those acids must be in the range of 4:6 to 6:4. A number of diamines are disclosed, including 2-methyl pentamethylene diamine, but all of the examples illustrating the invention are of copolymers of terephthalic acid, isophthalic acid and hexamethylene diamine.

A polyamide composition is therefore needed which provides a sufficiently high $T_g$, a low $T_{cc}$, a high HDT, reduced moisture sensitivity, and improved surface appearance, without losing the advantageous properties of prior art compositions. Such compositions can be molded at low temperatures to form articles which have good high temperature performance and are relatively free of stress.

SUMMARY OF THE INVENTION

In the present invention the addition of an aliphatic polyamide, such as polyamide 6,6 or 4,6, or a semiaromatic polyamide, such as polyamide 66/6T, to a certain mineral filled polyamide provides a composition with the above-identified properties. The polymeric compositions of the present invention have a $T_g$ ranging from about 80° C. to about 117° C. These compositions provide a $T_{cc}$ of about 100° C. to 160° C., depending on the concentration of the aliphatic polyamide. It has been found that both $T_g$ and $T_{cc}$ will be lowered with increasing concentrations of the aliphatic polyamide. Molded articles made from these compositions have a smooth, glossy surface appearance. The combination of these properties, along with other favorable properties of prior art compositions provides an advantageous polymeric composition.

According to the present invention there is provided a polymeric composition comprising:

(a) a first polyamide prepared from an aromatic carboxylic acid component and an aliphatic diamine component, the aliphatic diamine component being a mixture of hexamethylene diamine and 2-methyl 1,5-pentamethylene diamine;

(b) a second polyamide selected from an aliphatic polyamide, a semiaromatic polyamide, or mixtures or blends thereof; and (c) a mineral filler.

DETAILED DESCRIPTION OF THE INVENTION

The first polyamide (a) of the present invention is preferably crystalline or partially crystalline and is prepared having an aromatic carboxylic acid component and an aliphatic diamine component. The aromatic carboxylic acid component can be, but is not limited to, terephthalic acid or mixtures of terephthalic acid and isophthalic acid in which the amount of isophthalic acid is preferably less than 40 mole percent, of the mixture. In a preferred embodiment, the aromatic carboxylic acid component is 100% terephthalic acid. The aliphatic diamine component is a mixture of hexamethylene diamine and 2-methyl pentamethylene diamine, in which the aliphatic diamine component preferably contains at least 40 mole percent, based on the aliphatic diamine component, of hexamethylene diamine. Although reference is made herein specifically to 2-methyl pentamethylene diamine, persons skilled in the art will appreciate and understand the fact that other similar diamines, such as 2-ethyltetramethylene diamine, may also work in the present invention. Synthesis of 2-methyl pentamethylene diamine may be carried out by hydrogenation of the dimitrile of 2-methylgluteric acid. In the same manner, synthesis of 2-ethyltetramethylene diamine may be carried out by hydrogenation of the dimitrile of 2-ethyl succinic acid.

In one embodiment of the present invention, the amount of isophthalic acid, if present, plus 2-methyl pentamethylene diamine is 15–35 mole percent based on the total amount of aromatic carboxylic acid component and aliphatic diamine component.

The first polyamide (a) used in the present composition generally has a melting point of greater than about 280° C. and less than about 330° C., especially greater than 295° C. In addition, the first polyamide (a) is preferably a partially crystalline polymer having, generally, a molecular weight of at least 5,000. In some embodiments, the polyamide has a heat of fusion of greater than 17J/g. The inherent viscosity ("IV") is typically 0.9dl/g to 1.1dl/g, as measured at 23° C. in μ-cresol or concentrated sulfuric acid.

The first polyamide (a) can be made by methods known in the art. For example, a preferred polyamide can be prepared by a process comprising the steps of:

(a) feeding to a reactor an aqueous salt solution of an admixture of aromatic carboxylic acid and aliphatic diamine, in which the aromatic carboxylic acid is terephthalic acid or a mixture of terephthalic acid and isophthalic acid; the amount of isophthalic, if present, being less than 40 mole percent, of the mixture, and the aliphatic diamine is a mixture of hexamethylene diamine and 2-methyl pentamethylene aliamine, said aliphatic diamine containing at least 40 mole percent, based on the aliphatic diamine component, of hexamethylene diamine;

(b) heating the aqueous salt solution under pressure until the pressure in the reactor reaches at least about 1300 kPa, with water (in the form of steam) and other volatile matter being vented from the reactor;

(c) when the temperature of the reaction mixture has reached a temperature of at least about 250° C., preferably 270°–310° C., reducing the pressure in the reactor to atmospheric pressure over a period of at least 15 minutes in a manner that avoids excessive foaming of the reaction mixture;

(d) maintaining the reaction mixture at a pressure that is not greater than about atmospheric pressure, preferably under vacuum, until the copolyamide formed has reached a predetermined molecular weight; and (e) discharging the copolyamide from the reactor.

It will be understood by persons skilled in the art, that the first polyamide (a) used in the present invention can also be manufactured using solid phase polymerization, extrusion polymerization, continuous polymerization and the like.

The amounts of the acid component and the diamine component in the first polyamide (a) should be substantially complementary on a molar basis, as will be appreciated by persons skilled in the art. An excess of acids or diamines, especially the latter, can be used depending on the desired characteristics of the polyamide and the nature and extent of side reactions that may produce volatile or other matter. As is known, diamines tend to be more volatile than carboxylic acids and thus it may be desirable to feed an excess of diamine to the reactor. The molar ratio of hexamethylene diamine to 2-methyl pentamethylene diamine is at least 40:60; i.e., at least 40 mole percent of the aliphatic diamine component is hexamethylene diamine. In addition, the amount of isophthalic acid plus 2-methyl pentamethylene diamine is preferably in the range of 15–35 mole percent, preferably 20–30 mole percent based on the total amount of aromatic carboxylic acid component and aliphatic diamine component.

The aliphatic polyamides useful in the present invention as the second polyamide (b) are well known in the art and embrace those resins preferably having a molecular weight of at least about 5,000 and commonly referred to as nylons. Suitable polyamides include those described in U.S. Pat. Nos. 2,071,250; 2,071,251; 2,130,523; 2,130,948; 2,241,322; 2,241,322; 2,312,966; 2,512,606; and 3,393,210. Methods of production are well known in the art. For example, the polyamide resin(s) can be produced by condensation of equimolar amounts of saturated dicarboxylic acid containing from 4 to 12 carbon atoms with a diamine, in which the diamine contains from 4 to 14 carbon atoms. Excess diamine can be employed to provide an excess of amine end groups in the polyamide. Examples of polyamides include polytetramethylene adipamide (polyamide 4,6), polyhexamethylene adipamide (polyamide 6,6), polyhexamethylene azelaamide (polyamide 6,9), polyhexamethylene sebacamide (polyamide 6,10), polyhexamethylene dodecanoamide (polyamide 6,12), the polyamide produced by ring opening oflactams, i.e., poly-11-amino-undecanoic acid (polyamide 11), bis(paraaminocyclohexyl) methane dodecanoamide, and the like. It is also possible to use in this invention polyamides prepared by the copolymerization of two of the above polymers or terpolymerization of the above polymers or their components. Examples of copolycondensation polyamides include polyamide 6/66, polyamide 6/610, polyamide 6/12, polyamide 6/46, and the like. Preferably the polyamides are linear with a melting point in excess of 200° C. more preferably in excess of 250° C. Specifically, polyamide 4,6; polyamide 6,6; polyamide 6; polyamide 6,10; polyamide 6,12; polyamide 11; polyamide 12; polyamide 12,12; polyamide 6/6,6 etc. may be used. Among these polyamides, polyamide 4,6; polyamide 6.6; polyamide 6; or copolymers thereof or blends thereof are particularly suitable and preferred for the present invention. Polyamide 6,6 typically has a relative viscosity ("RV") of 50dl/g, as measured at 23° C. in 90% formic acid.

The semiaromatic polyamides useful in the present invention as the second polyamide (b) are also known in the art. These polyamides are polycondensates of aromatic dicarboxylic acids and aliphatic diamines. Examples of such semiaromatic polyamides are polyhexamethylene terephthalamide (polyamide 6T) and polyhexamethylene isopthalamide (polyamide 6I).

Additionally, mixtures or blends of aliphatic polyamides and semiaromatic polyamides may be useful in the present invention as the second polyamide (b). Examples include copolycondensation polyamides such as polyamide 6/6T, polyamide 6/6I, polyamide 66/6T, polyamide 66/6I, polyamide 6T6, polyamide 6TI, polyamide 6T10, and polyamide 6T12.

The mineral filler of this invention includes kaolin, mica, talc, wollastonite and similar kind of fillers, preferably having a length/width ratio (aspect ratio) between about 1:1 to 20:1.

The compositions of the present invention may also include one or more additives known in the art, such as nucleants, thermal stabilizers, ultraviolet stabilizers and antioxidants, lubricants, flame retardants and colorants. The organic thermal stabilizers include phosphites, hindered phenols and hindered amines or metallic heat stabilizers.

Nucleating agents include talc, calcium fluoride and salts of phosphorous acids, for example sodium phenyl phosphinate. For the adjustment of the coefficient of linear thermal expansion and HDT, it may be suitable to add a small amount of glass fibers or glass flakes, for example 2–10% by weight glass fibers or glass flakes. It is believed that levels of glass fiber or glass flakes higher than 5–10% by weight will negatively affect surface gloss and distinctness of image (DOI). Other fillers may also be used e.g. in amounts of 0–20% by weight. Examples of such fillers include, but are not limited to, diatomaceous earth, day, quartz, titanium dioxide, molybdenum disulfide, gypsum, iron oxide, zinc oxide, fibers e.g. carbon, boron, aromatic and ceramic fibers, powdered polytetrafluoroethylene and the like.

The polymeric composition of the present invention is prepared by methods known in the art. Preferably, to avoid excessive polymer degradation during compounding and injection molding, all polymer preblends and compounded blends should be pre-dried to a moisture content below about 0.05%. The ingredients are then mixed in their proper proportions in a suitable vessel such as a drum or a plastic bag. The mixture is then melt blended, preferably in a single or twin screw extruder, at a melt temperature, measured at the exit of the extruder die, of about 320° C. to 350° C. Melt temperatures below 320° C. are appropriate when aliphatic polyamides are used which have a melting point lower than about 260° C., such as polyamide 6,6, whereas melt temperatures significantly above 350° C., generally, should be avoided to keep degradation of the aliphatic polyamide to a minimum. It will be understood by persons skilled in the art that the appropriate melt temperature can be determined easily, without undue experimentation.

For good dispersion of all components, it is preferable to use a twin screw extruder with appropriate screw design, although single screw extruders are suitable as well. Appropriate screw design can also be easily determined, without undue experimentation, by persons skilled in the art. For specific reasons, it may be desirable to side-feed part of the ingredients downstream into the extruder. It may be advantageous for some compositions to melt blend the polymeric ingredients (a) and (b) prior to the addition of the filler (c) and/or any other additives. The compounded blend exiting the die is quenched in water, surface water is removed by compressed air and the quenched blend then cut into pellets. In cases where the remaining moisture content of the prepared product is higher than 0.05%, the material is, preferably, dried in a alehumidifying or vacuum oven.

In order to examine the properties of the composition, the dry material is then molded into test specimens using a standard injection molding machine. There are no specific restrictions as to the injection molding equipment. However, it is recommended to use a screw design which is typically used for semi-crystalline polymers such as polyamides. If the screw depth in the feeding and the metering zones is too deep and the compression ratio is too low, insufficient and inhomogeneous melting of the different components of the blend can result. Preferably, the melt temperature is preferably about 320° C. to about 350° C. and the mold temperature is, preferably, about 130° C. to about 150° C., depending on the $T_{cc}$ of the resin, which is influenced by the total amount of the second polyamide (b) in these polymeric compositions. Such an adjustment can be easily made, without undue experimentation, by persons skilled in the art. Other important molding parameters such as injection and hold pressure and screw forward time may be adjusted for optimum appearance of the molded specimens.

The compositions of the present invention can be used in the manufacture of a wide variety of products using melt processing techniques, especially products intended for use at temperatures that are higher than those typically used with other polyamide compositions and especially products requiring a smooth, glossy surface. For example, the compositions of the present invention can be formed into articles using injection molding e.g. into valves, tanks, containers, washers and the like for automotive enduses; into articles for electrical end-uses; and into articles where retention of mechanical properties under the influence of heat, moisture, hydrocarbons, alcohols, including so-called gasohol, and the like are important. Alternatively, the compositions of the present invention can be spun into fibers e.g. for sewing or industrial threads for end-uses where low shrinkage and elongation are important and/or retention of properties under the influence of moisture, hydrocarbons, alcohol and the like is important.

The compositions of the present invention can also be formed into films and sheets. Barrier properties of these compositions to water and oxygen can also find uses in many shaped article uses. The compositions of the present invention are also particularly useful for end-uses where retention of properties at elevated temperatures is required, including retortable containers.

EXAMPLES

Control resins 1, 2, 3 and 4 are comparative examples of which control resin 4 is based on 100% polyamide 6,6. Examples 1 to 5 relate to 50 wt % mineral filled resins with up to 19.7 wt % polyamide 6,6, based on the total amount of polyamide. In examples 6, 7, 8, 10, and 11, a small percentage of the 50 wt % mineral filler was replaced by 2.5 wt % or 5 wt % of either glass fiber or glass flake. Example 9 is a 50 wt % mica filled copolyamide with 10.1 wt % of polyamide 6,6, based on the total amount of polyamide.

Control resins 5, 6, 7, and 8 were more comparative examples of which control resins 5 and 6 were based 100% on polyamide 6T/DT, with resin 5 being mineral filled with 50 wt %, whereas resin 6 was filled with a combination of 40 wt % mineral and 10 wt % glass fibers. Control resins 7 and 8 were both mineral filled with 50 wt %; resin 7 was based 100% on polyamide 4,6 and resin 8 was based 100% on polyamide 66/6T, respectively.

Example resin 12 was equivalent to control resin 6, except that it contained 40 wt % polyamide 6,6 per total polyamide base polymer. Example resins 13 and 15 were both 50 wt % mineral filled and based on blends of polyamide 6T/DT with 19.9 wt % and 40.0 wt % polyamide 4,6, per total polyamide base polymer, respectively. Example resin 14 was equivalent to example resin 13, but filled with a combination of 40 wt % mineral and 10 wt % glass fibers. Both example resins 16 and 17 were based on a 50/50% blends of polyamide 6T/DT and polyamide 66/6T and filled with 50 wt % mineral filler and 40 wt % mineral and 10 wt % glass fibers, respectively.

The semiaromatic polyamide used in control resins 1 to 3, 5 and 6, and in example resins 1 to 17 is based on 50/50 wt % hexamethylene diamine/2-methyl 1,5-pentamethylene aliamine and 100 wt % terephthalic acid with an IV of 0.9 to 1.1 dl/g, measured at 25° C. in m-cresol or sulfuric acid.

The aliphatic polyamide 6,6 used in example resins 1 to 12 was a standard polyamide 6,6 with a relative viscosity of 50, measured at 23° C. in 90% formic acid and lubricated containing a small amount of an aluminum di-stearate.

The aliphatic polyamide 4,6 used in control resin 7 and in example resins 13, 14, and 15 was a polyamide 4,6 commercially available from DSM Holland under the trade name STANYL TW300.

The semiaromatic copolyamide 66/6T (55/45%) used on control resin 8 and in example resins 16 and 17 was a product commercially available from Mitsui Petrochemicals Industries, Ltd. (Japan) under the trade name ARLEN C2000.

The mineral filler used in control resins 2, 3, and 5 to 8 and in example resins 1 to 8 and 10 to 17 was a calcined aluminum silicate ("kaolin"), surface coated with an amino silane and with an average particle size of below 2 micron for 55–60 wt % and above 10 micron for 8 wt % of the filler. The mineral filler used in example resin 9 was an uncoated, uncalcined potassium-aluminum silicate ("muscovite mica") with an average particle size of below 80 micron for 91 wt % of the filler.

Example resins 6, 7, 10, 11, 12, 14, and 17 and control resin 6 additionally contained small amounts (i.e., 2.5 wt %, 5.0 wt % or 10 wt %) of an amino silane coated glass fiber which is commonly used for polyamides. Example resin 8 contained 5 wt % of epoxy silane coated glass flakes.

Control resins 2 to 8 and example resins 1 to 17 contained as other additives 0.2 wt % or 0.3 wt % of a metallic heat stabilizer, control resin 3 and example resins 2, 3, and 5 to 9 contained 0.2 wt % or 0.25 wt % of a polymeric nucleant. Example resin 9 also contained 0.3 wt % of an amino silane.

Only polyamide polymers with a moisture content of 0.05% to 0.10% were used.

The ingredients listed in Tables 1, 2, 3, and 4 were tumble blended and fed as a total pre-blend into the rear of a 25 mm Berstorff twin screw extruder or into the rear of a 2.5 inch Sterling single screw extruder for those resins which contained small amounts of glass fibers of glass flakes. Compounding was conducted at a feed rate of 5–10 kg/hr and a screw speed of 250 to 280 rpm for twin screw extruders and 80 to 120 rpm for single screw extruders. Barrel temperatures were set to get a melt temperature of the melt at the exit of the die of 320° C. to 340° C. The extrudate exiting the die was quenched in water, the surface water on the strands removed by compressed air and cut into pellets. The pellets were then dried in a vacuum oven at 80° to 100° C. over night to a moisture content of about 0.05% prior to injection molding of the test specimens with a mold temperature of 135° C. to 150° C. and a melt temperature of 320° C., respectively.

$T_g$ was measured by the Dynamic Mechanical Analysis ("DMA") method in a temperature range from −50° C. to 290° C. and a heating rate of 2 deg/min. Test specimens used were either injection molded 10×45.2×4 mm bars or 10–13×45.2×3 mm bars which had been cut in length direction from a 75×100×3 mm plaque.

Cold crystallization peak temperature $T_{cc}$ was measured by DSC by heating a pellet sample, which was cut from a rapidly quenched extrusion strand, in a DSC cell from 23° C. to 350° C. with a heating rate of 10 deg/min. Due to the rapid quenching of the strands during extrusion of resins with a reltively high $T_g$ of greater than 80°–100° C., the pellets are not completely crystallized. They show therefore an exothermic cold crystallization peak upon heating the sample in the DSC cell.

HDT was measured according to ISO75 on 10×120×4 mm ISO bars, at a load of 1.82MPa and a heating rate of 50 deg/hr. The test bars were measured both dry-as-molded as well as after annealing the test specimen in an air circulating oven for 1 hour at 170° C., except for the resins in Table 4, which were annealed for 3 hours at 180° C.

Coefficient of Linear Thermal Expansion ("CLTE") in the flow direction of a molded specimen was measured from 23° C. to 140° C. with a heating rate of 1 deg/min by Thermo Mechanical Analysis ("TMA") on a specimen that was cut either from the center of a 75×100×3 mm plaque or from the center of a 10×120×4 mm bar.

Surface gloss was measured with a portable micro-Tri-Gloss Reflektometer from BYK Gardner under reflection angles of 20, 60 and 85 degrees. For control resins 2 to 8 and for example resins 1 to 17 the specimens for the gloss measurements were 75×100×3 mm plaques, which had been molded at a mold temperature of 135° C. to 150° C. and a melt temperature of 320° C. The measured Tri-Gloss values do not provide an absolute measurement of surface gloss and relatively small differences in Tri-Gloss values are often more obvious by the naked eye; therefore, appearance was judged visually to rank surface appearance amongst the control and example resins.

The distinctness of an image (DOI) as reflected on the surface of a molded specimen was also rated visually by the naked eye in order to characterize qualitatively the 'roughness' of the surface. Especially for comparing resins containing only mineral fillers with those which contain some additional glass fibers or glass flakes, this differentiation is important. Even when the measured Tri-Gloss values disclose the same surface gloss for both types of compositions, the DOI, however, is best when mineral fillers are used alone.

Control resin 1 showed a $T_{cc}$ of 172.3° C. and a $T_g$ of 125° C. for the neat semiaromatic copolyamide. Control resins 2 and 3 showed that the addition of 50 wt % of mineral filler, without and with 0.25 wt % of a polymeric nudeant did not reduce the $T_{cc}$ and the $T_g$ significantly compared to the neat control resin 1.

The unnucleated example resin I showed that 19.5 wt % of polyamide 6,6, per total polyamide, had an advantageous effect on the surface gloss of molded specimens, especially at smaller light reflection angles of 20 degrees and 60 degrees in comparison to the unnucleated control resin 2. The addition of 19.5 wt % polyamide 6,6 lowered the $T_g$ to 111.5° C. and the $T_{cc}$ to 147.3° C.

The nucleated example resins 2 and 3 also showed that the addition of 9.6 wt % and 19.7 wt % of polyamide 6,6 decreased $T_g$ and $T_{cc}$ to 110.9° C. and 99.3° C., and to 159.7° C. and 147.3° C., respectively. Surface gloss, appearance and distinctness of image of resins 2 and 3 improved when compared to control resins 1 and 2.

The unnucleated example resin 4 and the nucleated example resins 5 to 8 having 10% polyamide 6,6 provided improved surface appearance. The $T_g$ and $T_{cc}$ of all 5 example resins in Table 2 was about 114° C. and 160° C., respectively. Example resins 10 and 11 showed that 35.1 wt % and 45.0 wt %, respectively of polyamide 6,6, per total polyamide, reduced $T_g$ to below 90° C. and $T_{cc}$ to below 135° C. Example resins 6, 7 and 8 showed the decreasing effect of small percentages of higher aspect ratio fillers such as either 2.5 wt % and 5 wt % of glass fibers or of 5 wt % of glass flakes, respectively, on the CLTE in comparison to example resin 5, without a significant loss in surface gloss. It is obvious to those skilled in the art, that higher levels of such higher aspect ratio fillers may reduce CLTE even further.

Example resin 9 shows that 50 wt % of muscovite mica reduces CLTE to 26.3×10−6 l/K and increases the annealed HDT to 192.5° C. In comparison to mica-filled polyamide 6.6 (Control Resin 4), there is a significant improvement in gloss, appearance and distinctness of image for the inventive compositions.

Example resin 12 showed the significantly reduced $T_g$ of 89.1° C. and $T_{cc}$ of 120° C. in comparison to control resins 5 and 6, and in comparison to control resin 6 an overall better retention of surface appearance, due to the presence of 40 wt % of polyamide 6,6, per total amount of polyamide. Example resin 12 had the additional advantage that due to its lower $T_{cc}$ of 120.1° C., it could be molded at a lower mold temperature of about 130° C. and still obtain maximum relative crystallinity, whereas control resin 6, when molded at 130° C., would crystallize less completely due to its higher $T_{cc}$ of 171.1° C.

Control resin 7, which is based 100% on polyamide 4,6, showed a very poor surface appearance. Example resins 13 to 15 showed that when polyamide 4,6 was added to semiaromatic copolyamide 6T/DT it improved surface appearance in a very similar way as polyamide 6,6 did. Example resin 15, which contained 40 wt % of polyamide 4,6, per total polyamide, exhibited a very good surface appearance. Example resin 14 showed that a blend of polyamide 6T/DT with 19.9 wt % of polyamide 4,6, per total polyamide, which also contained 10 wt % of glass fibers, exhibited a similarly high HDT as control resin 7, but with much improved surface appearance.

polyamide 66/6T showed an improved surface appearance over control resin 8, with a similar HDT, but a significantly reduced CLTE. Example resin 17 showed a further improvement in both overall surface appearance, CLTE and HDT.

GLOSSARY OF TERMS USED IN TABLES 1–4;

Polyamide=50/50% 6T/DT polyamide
6 (first)=hexamethylene diamine
6 (second)=adipic acid
T=terephthalic acid
D=2-methyl 1,5-pentamethylene diamine
4=tetra methylene diamine
PA6,6=polyamide 6,6
PA4,6=polyamide 4,6 (STANYL TW300 from DSM Holland)
PA66/6T=55/45% polyamide 66/6T (ARLEN C2000 from Mitsui Japan)
kaolin=amino-silane coated, calcined aluminum silicate
mica=uncoated, uncalcined potassium-aluminum silicate
silane=amino-silane
glass fiber=E-glass, G-filament 10 micron/3 mm fiber length, amino-silane coated
glass flake=E-glass, 140 micron/5 micron thickness, epoxy-silane coated
nudeant=polymeric nudeant based on polyamide 2,2
heat stabilizer=metallic heat stabilizer
Appearance=visual inspection to rate surface appearance
Distinctness=visual inspection to rate distinctness of a reflected image on the surface of a molded specimen

TABLE 1

| | Control Resin | | | | | |
|---|---|---|---|---|---|---|
| | 1 | 2 | 3 | | | |
| | | | Example Resin | | | |
| Component | Wt % | Wt % | 1 Wt % | Wt % | 2 Wt % | 3 Wt % |
| Polyamide | 100.00 | 49.7 | 40.0 | 49.45 | 44.70 | 39.70 |
| PA6.6 | — | — | 9.7 | — | 4.75 | 9.75 |
| Kaolin | — | 50.00 | 50.00 | 50.00 | 50.00 | 50.00 |
| Nucleant | — | — | — | 0.25 | 0.25 | 0.25 |
| Heat Stabilizer | — | 0.30 | 0.30 | 0.30 | 0.30 | 0.30 |
| Total Wt % | 100.00 | 100.00 | 100.00 | 100.00 | 100.00 | 100.00 |
| % PA6.6/PA | 0.0 | 0.0 | 19.5 | 0.0 | 9.6 | 19.7 |
| $T_g$ (°C.)[1] | 125.0 | 125.3 | 111.5 | 125.7 | 110.9 | 99.3 |
| $T_{cc}$ peak (°C.)[2] | 172.3 | 168.2 | 147.3 | 168.4 | 159.7 | 147.3 |
| HDT[3] dry-as-molded (°C.) | — | 171 | 158 | 148 | 140 | 137 |
| HDT[3] after annealing 1 h/170° C. (°C.) | — | 185 | 179 | 173 | 166 | 179 |
| CLTE($10^{-6}$ 1/K)[4] | — | — | — | 32.3 | — | — |
| Gloss @ 20°[5] | — | 34.3 | 51.8 | 40.7 | 53.7 | 54.5 |
| Gloss @ 60°[5] | — | 76.6 | 85.3 | 78.5 | 85.4 | 84.4 |
| Gloss @ 85°[5] | — | 96.9 | 101.0 | 95.2 | 98.2 | 97.7 |
| Appearance | — | Matte | Glossy | Matte | Glossy | Glossy |
| Distinctness | — | Good | High | Good | High | High |

[1]Glass Transition Temperature
[2]Cold Crystallization Temperature
[3]Heat Distortion Temperature
[4]Coefficient of Linear Thermal Expansion
[5]Tri-Gloss Control resin 8, which was based 100% on polyamide 66/6T showed a similarly poor surface appearance as control resin 7. Example resin 16, which was 50 wt % mineral filled and based on a 50/50% blend of polyamide 6T/DT and

TABLE 2

| Example Resin Component | 4 Wt % | 5 Wt % | 6 Wt % | 7 Wt % | 8 Wt % |
|---|---|---|---|---|---|
| Polyamide | 44.8 | 44.6 | 44.6 | 44.6 | 44.6 |
| PA6.6 | 5.0 | 5.0 | 5.0 | 5.0 | 5.0 |
| Kaolin | 50.0 | 50.0 | 47.5 | 45.0 | 45.0 |
| Glass Fiber | — | — | 2.5 | 5.0 | — |
| Glass Flake | — | — | — | — | 5.0 |
| Nucleant | — | 0.2 | 0.2 | 0.2 | 0.2 |
| Heat Stabilizer | 0.2 | 0.2 | 0.2 | 0.2 | 0.2 |
| Total % | 100.00 | 100.00 | 100.00 | 100.00 | 100.00 |
| % PA6.6/PA | 10.1 | 10.1 | 10.1 | 10.1 | 10.1 |
| $T_g$ (°C.)[1] | 114.9 | 113.0 | 113.4 | 115.6 | 114.6 |
| $T_{cc}$ peak (°C.)[2] | 160.4 | 160.6 | 159.4 | 160.6 | 159.2 |
| $HDT^3$ dry-as-molded (°C.) | 135.4 | 130.5 | 133.6 | 139.7 | 135.5 |
| $HDT^3$ after annealing 1 h/170° C.(°C.) | 171.5 | 171.3 | 178.0 | 184.5 | 178.0 |
| CLTE($10^{-6}$ 1/K)[4] | 38.7 | 32.8 | 39.3 | 34.3 | 30.1 |
| Gloss @ 20°[5] | 57.0 | 57.8 | 58.4 | 58.8 | 56.2 |
| Gloss @ 60°[5] | 90.2 | 90.4 | 90.9 | 88.9 | 89.3 |
| Gloss @ 85°[5] | 99.4 | 98.5 | 98.6 | 97.4 | 97.5 |
| Appearance | Glossy | Glossy | Glossy | Glossy | Glossy |
| Distinctness | High | High | Lower | Lower | Lower |

[1]Glass Transition Temperature
[2]Cold Crystallization Temperature
[3]Heat Distortion Temperature
[4]Coefficient of Linear Thermal Expansion
[5]Tri-Gloss

TABLE 3

| Component | Control Resin 4 Wt % | Example Resin 9 Wt % | Example Resin 10 Wt % | Example Resin 11 Wt % |
|---|---|---|---|---|
| Polyamide | — | 44.3 | 32.3 | 27.4 |
| PA6.6 | 47.5 | 5.0 | 17.5 | 22.4 |
| PA4.6 | — | — | — | — |
| PA66/6T | — | — | — | — |
| Mica | 52.0 | 50.0 | — | — |
| Silane | 0.3 | 0.3 | — | — |
| Kaolin | — | — | 45.0 | 45.0 |
| Glass Fiber | — | — | 5.0 | 5.0 |
| Nucleant | — | 0.2 | — | — |
| Heat Stabilizer | 0.2 | 0.2 | 0.2 | 0.2 |
| Total % | 100.0 | 100.0 | 100.0 | 100.0 |
| % PA6.6/PA | 100.0 | 10.1 | 35.1 | 45.0 |
| $T_g$(°C.)[1] | 69.1 | 117.2 | 84.4 | 83.6 |
| $T_{cc}$ peak (°C.)[2] | None | 157.7 | 132.0 | — |
| $HDT^3$ dry-as-molded (°C.) | 202.8 | 146.0 | 168.8 | 178.1 |
| $HDT^3$ after annealing 1 h/170° C.(°C.) | 206.5 | 192.5 | 182.2 | 185.6 |
| CLTE($10^{-6}$ 1/K)[4] | 32.0 | 26.3 | 34.5 | 35.6 |
| Gloss @ 20°[5] | 4.0 | 45.0 | 55.0 | 58.4 |
| Gloss @ 60°[5] | 22.0 | 87.0 | 89.3 | 89.1 |
| Gloss @ 85°[5] | 57.0 | 98.0 | 99.0 | 99.8 |
| Appearance | Very Matt | Glossy | Glossy | Glossy |
| Distinctness | Very Low | High | Lower | Lower |

[1]Glass Transition Temperature
[2]Cold Crystallization Temperature
[3]Heat Distortion Temperature
[4]Coefficient of Linear Thermal Expansion
[5]Tri-Gloss

TABLE 4

| Component | Control Resin 5 Wt % | Control Resin 6 Wt % | Control Resin 7 12 Wt % | Example Resin — Wt % | Example Resin 13 Wt % | Example Resin 14 Wt % | Example Resin 15 Wt % | Control Resin 8 — Wt % | Example Resin 16 Wt % | Example Resin 17 Wt % |
|---|---|---|---|---|---|---|---|---|---|---|
| Polyamide | 49.8 | 49.8 | 29.9 | — | 39.9 | 39.9 | 29.9 | — | 24.9 | 24.9 |
| PA6.6 | — | — | 19.9 | — | — | — | — | — | — | — |
| PA4.6 | — | — | — | 49.8 | 9.9 | 9.9 | 19.9 | — | — | — |
| PA66/6T | — | — | — | — | — | — | — | 49.8 | 24.9 | 24.9 |
| Kaolin | 50.0 | 40.0 | 40.0 | 50.0 | 50.0 | 40.0 | 50.0 | 50.0 | 50.0 | 40.0 |
| Glass Fiber | — | 10.0 | 10.0 | — | — | 10.0 | — | — | — | 10.0 |
| Heat Stabilizer | 0.2 | 0.2 | 0.2 | 0.2 | 0.2 | 0.2 | 0.2 | 0.2 | 0.2 | 0.2 |
| Total % | 100.0 | 100.0 | 100.0 | 100.0 | 100.0 | 100.0 | 100.0 | 100.0 | 100.0 | 100.0 |
| % PA6.6/PA | 0.0 | 0.0 | 40.0 | — | — | — | — | — | — | — |
| % PA4.6/PA | — | — | — | 100.0 | 19.9 | 19.9 | 40.0 | — | — | — |
| % PA66/6T/PA | — | — | — | — | — | — | — | 100.0 | 50.0 | 50.0 |
| $T_g$ (°C.)[1] | 135.0 | 133.9 | 89.1 | 75.3 | 110.4 | 109.8 | 102.4 | 93.1 | 112.4 | 111.9 |
| $T_{cc}$ peak (°C.)[2] | 167.5 | 171.1 | 120.1 | 72.6 | 149.8 | 143.3 | — | 102.7 | 137.0 | 134.3 |
| $HDT^3$ dry-as-molded (°C.) | 159.7 | 213.7 | 209.5 | 237.0 | 155.6 | 212.9 | 162.2 | 175.3 | 169.2 | 232.9 |
| $HDT^3$ after annealing 3 h/180° C. (°C.) | 194.0 | 234.4 | 213.1 | 247.8 | 186.4 | 217.5 | 190.9 | 196.6 | 191.3 | 234.4 |
| CLTE($10^{-6}$ 1/K)[4] | 30.8 | 29.4 | 26.6 | 59.8 | 23.7 | 26.9 | 48.0 | 63.4 | 37.8 | 34.9 |
| Gloss @ 20°[5] | 46.6 | 51.5 | 49.5 | 4.2 | 53.1 | 51.5 | 53.2 | 5.6 | 12.5 | 40.1 |
| Gloss @ 60°[5] | 78.1 | 81.9 | 79.8 | 20.1 | 81.5 | 81.5 | 79.8 | 37.3 | 47.7 | 72.9 |
| Gloss @ 85°[5] | 98.2 | 94.1 | 91.5 | 73.5 | 96.9 | 96.4 | 95.2 | 88.9 | 89.6 | 91.6 |
| Appearance | Glossy | Glossy | Glossy | Very Matte | Glossy | Glossy | Glossy | Very Matte | Matte | Glossy |
| Distinctness | Good | Lower | Slightly Lower | Very Low | High | Slightly Lower | High | Very Low | Very Low | Slightly Lower |

I claim:

1. A polymeric composition having a glass transition temperature within the range of from about 80° C. to about 117° C. as measured by Dynamic Mechanical Analysis and having an exothennic cold crystallization peak temperature within the range of from about 100° C. to about 160° C. as measured by Differential Scanning Colorimetry; said polymeric composition comprising (a) a first polyamide prepared from an aromatic carboxylic acid component and an aliphatic diamine component, said aliphatic diamine component being a mixture of hexamethylene diamine and 2-methyl-1,5-pentamethylene diamine; (b) a second polyamide selected from the group consisting of aliphatic polyamides, semiaromatic polyamides, and mixtures or blends thereof; and (c) a mineral filler.

2. The composition of claim 1 in which the aromatic carboxylic acid component is a mixture of isophthalic acid and terephthalic acid and the isophthalic acid constitutes less than 40 mole percent of the mixture.

3. The composition of claim 1 in which the aliphatic diamine component is at least 40 mole percent of hexamethylene diamine.

4. The composition of claim 1 in which the first polyamide (a) has a melting point in the range of 280° C. to 330° C.

5. The composition of claim 1 in which the second polyamide is an aliphatic polyamide selected from polyamide 6,6, polyamide 6, or polyamide 4,6.

6. The composition of claim 1 in which the mineral filler is kaolin, mica, talc, or wollastonite.

7. The composition of claim 1 in which the mineral filler has an aspect ratio between 1 to 20.

8. The composition of claim 1 further comprising glass fibers with an aspect ratio of larger than 20 to 1.

9. The composition of claim 1 in which the amount of isophthalic acid plus 2-methyl 1,5-pentamethylene diamine used to form the first polyamide (a) is 15–35 mole percent of the total amount of aromatic carboxylic acid component and aliphatic diamine component.

10. The composition of claim 1 in which the aromatic carboxylic acid is terephthalic acid.

11. The composition of claim 1 in which the heat of fusion of the first polyamide (a) is greater than 17 J/g.

12. The composition of claim 1 in which the first polyamide (a) constitutes 5–50% by weight of the composition.

13. The composition of claim 1 in which the second polyamide (b) constitutes 5–50% by weight of the composition.

14. The composition of claim 1 in which the mineral filler constitutes 5–60% by weight of the composition.

15. The composition of claim 1 further comprising at least one additive selected from the group consisting of stabilizers, flame retardants, smoke depressants, plasticizers, conductive agents, antistatic agents, lubricants, mold release, nucleating agents, dyes, pigments, toughening and other modifying agents.

16. A fiber formed from the composition of claim 1.

17. A molded article formed from the composition of claim 1.

18. The molded article claim 17 in which the surface of the article has a high gloss.

* * * * *